(12) United States Patent
Nalawade (10) Patent No.: US 8,320,378 B2
(45) Date of Patent: *Nov. 27, 2012

(54) METHOD AND APPARATUS FOR ADVERTISING UPDATE MESSAGES TO PEERS AND PEER GROUPS IN A BORDER GATEWAY PROTOCOL PROCESS

(75) Inventor: Gargi Nalawade, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 271 days.

This patent is subject to a terminal disclaimer.

(21) Appl. No.: 12/533,666

(22) Filed: Jul. 31, 2009

(65) Prior Publication Data

US 2011/0026533 A1     Feb. 3, 2011

Related U.S. Application Data

(63) Continuation of application No. 10/616,555, filed on Jul. 9, 2003, now Pat. No. 7,571,241.

(51) Int. Cl.
*H04L 12/28* (2006.01)
*H04L 12/56* (2006.01)
*G06F 15/16* (2006.01)

(52) U.S. Cl. ........ 370/392; 370/401; 709/230; 709/234; 709/235

(58) Field of Classification Search .................. 709/230, 709/234, 235; 370/392, 401
See application file for complete search history.

(56) References Cited

U.S. PATENT DOCUMENTS

| | | | |
|---|---|---|---|
| 577,327 A | 12/1994 | Jain et al. | |
| 5,490,252 A | 2/1996 | Macera et al. | |
| 5,974,465 A * | 10/1999 | Wong | 709/234 |
| 6,392,997 B1 * | 5/2002 | Chen | 370/252 |
| 6,704,795 B1 | 3/2004 | Fernando et al. | |
| 7,165,107 B2 | 1/2007 | Pouyoul et al. | |

OTHER PUBLICATIONS

Rekhter & Gross, Editors, entitled "Application of the Border Gateway Protocol in the Internet", Network Working Group dated Mar. 1995, (pp. 1-19), http://www.ietf.org/rfc/rfc1772.txt.

(Continued)

*Primary Examiner* — Alpus H Hsu
*Assistant Examiner* — Yee Lam
(74) *Attorney, Agent, or Firm* — Hickman Palermo Truong Becker Bingham Wong LLP (57) ABSTRACT

A method is disclosed for advertising update messages to peers and peer entities. In an embodiment, all update messages that are to be advertised to a specific peer entity are formatted and enqueued to a peer associated with that peer entity before update messages are formatted for another peer entity. In an aspect, the method advertises update messages to peer entities in a communication network comprises, among a quantity of update messages, formatting one or more of the update messages to establish a quantity of formatted update messages for a peer entity, wherein said peer entity is one of a peer group and a peer, wherein the quantity of the formatted update messages is less than or equal to the quantity of update messages, and among the formatted update messages, enqueueing to a queue, one or more formatted update messages, to establish a quantity of enqueued formatted update messages, wherein the quantity of enqueued formatted update messages is less or equal to the quantity of formatted update messages, and wherein at least one of the quantity of formatted update messages and the quantity of the enqueued formatted update messages is a programmable quantity.

20 Claims, 9 Drawing Sheets

OTHER PUBLICATIONS

Y. Rekhter, Editor, entitled "RFC 1266—Experience with the BGP Protocol", Network Working Group dated Oct. 1991, (pp. 1-9), http://www.faqs.org/rfcs/rfc1266/html.

Rekhter & Li, Editors, entitled "A Border Gateway Protocol 4 (BGP-4)", Network Working Group dated Mar. 1995, (pp. 1-57), http://www.ietf.org/rfc/rfc1771.txt.

P. Traina, Editor, entitled "BGP-4 Protocol Analysis" Network Working Group dated Mar. 1995, (pp. 1-10), http://www.ietf.org/rfc/rfc1774.txt.

Cisco Systems entitled, "Cisco IOS Software Releases 11.0, Configuring IP Routing Protocols", (pp. 1-112), © 1992-2003 Cisco Systems, Inc., updated Sep. 9, 2002, www.cisco.com/en/US/products/sw/iosswrell/rs1818/products_configuration_guide_chapter09186a0080....

Cisco Systems, entitled "Cisco IOS Software Releases 12.0 S, Emplicit Tracking of Hosts, Groups, and Channels for IGMP Version 3", (pp. 1-9), © 1992-2003 Cisco Systems, Inc., updated Jan. 17, 2003, http://www.cisco.com/en/US/products/sw/iosswrell/ps1829/products_feature_guide09186a00....

Cisco Systems entitled "Troubleshooting High CPU Caused by the BGP Scanner or BGP Router Process", Document ID: 45620, dated Sep. 29, 2003, (10 pgs).

* cited by examiner

METHOD AND APPARATUS FOR ADVERTISING UPDATE MESSAGES TO PEERS AND PEER GROUPS IN A BORDER GATEWAY PROTOCOL PROCESS

BENEFIT CLAIM

This application claims the benefit under 35 U.S.C. 120 as a Continuation of prior application Ser. No. 10/616,555, filed Jul. 9, 2003, now U.S. Pat. No. 7,571,241 the entire contents of which are hereby incorporated by reference for all purposes as if fully set forth herein.

FIELD OF THE INVENTION

The present invention generally relates to network convergence. The invention relates more specifically to a method and apparatus for advertising update messages to individual peers and peers belonging to peer groups in a Border Gateway Protocol (BGP) process.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

BGP is a protocol used for routing in communication networks. In convergence, peer entities learn information about the available routes in a network. As routes are added, removed or changed in a communication network, update messages are sent to peer groups to inform the peer groups about changes in routes. As more routes are added to the network, the convergence time for BGP and the time for advertising all BGP routes to all BGP peers increases.

Present approaches of BGP maintain fairness among peer groups while advertising update messages. Fairness requires a first update message to be advertised to all required peers or peers groups prior to advertising a second update message to peers or peer groups. Maintaining fairness across all peers or peer groups results in a great number of messages having to be advertised during BGP convergence. The great amount of messages that must be generated and advertised results in lengthy convergence times.

Based on the foregoing, it would be desirable to avoid generating and sending the quantity of messages that are currently generated and sent under prior art approaches. By avoiding generating and sending messages in such quantities, convergence time may be increased.

BRIEF DESCRIPTION OF THE DRAWINGS

The present invention is illustrated by way of example, and not by way of limitation, in the following figures.

DETAILED DESCRIPTION OF THE INVENTION

A method and apparatus for advertising update messages to individual peers and peer groups is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
   2.0 Structural and Functional Overview
   3.0 Method Advertising Update Messages to Peer Groups
   4.0 Memory Limiting Schemes
   5.0 Implementation Mechanisms—Hardware Overview
   6.0 Extensions and Alternatives
   1.0 General Overview The needs identified in the foregoing Background of the Invention section, and other needs and objects that will become apparent for the following description, are achieved in the present invention, which comprises, in one aspect, a method for advertising update messages in a manner that results in improved convergence times.

In an embodiment, peer groups in a communication network are updated by method wherein, among a quantity of update messages, one or more of the update messages is formatted to establish a quantity of formatted update messages to be sent to a peer group. One or more formatted update messages is enqueued to a queue to establish a quantity of enqueued formatted update messages. At least one of the quantity of formatted update messages and the quantity of the enqueued formatted update messages is a programmable quantity.

The foregoing embodiment and other embodiments eliminate fairness across peers and peer groups during BGP convergence. The elimination of fairness results in the advertisement of a lower quantity of messages in the convergence process, which, in turn, results in improved convergence times.

In embodiments, the elimination of fairness across all peers and peer groups also results in more efficient use of resources. For example, by eliminating fairness, it is possible to store more update messages in the same amount of available memory. This results in more efficient update packing and replication. Because all update messages intended for a single individual peer or peer group are advertised, 100% update packing is achievable, and, all of the update messages may be replicated, thus resulting in 100% update replication. CPU usage is also reduced because fewer update messages must be formatted when the disclosed methods and apparatus are implemented. The reduction in the quantity of update messages that are sent also results in more efficient utilization of network bandwidth.

Additionally, because more update messages can be stored and advertised, the described methods result in more accurate convergence. The convergence is more accurate because a greater proportion of update messages are advertised, and a lower proportion of update messages are dropped.

The disclosed methods and apparatus employ a structure wherein a cache for storing formatted update messages is associated with each peer group and with each peer that is not a member of a peer group. In the disclosed methods, the formatting of messages and the enqueuing of messages are performed separately. Update messages are formatted and stored in the cache. The formatted update messages in the cache are then enqueued to a queue associated with the peer group or peer, and are subsequently sent to the peer group or peer. A method that involves checkpointing a BGP table version is also described. This method reduces the advertisement churn when updates are received from many sources.

In other aspects, the invention encompasses a computer apparatus and a computer-readable medium configured to carry out the foregoing steps.

2.0 Structural and Functional Overview

A method and apparatus for advertising update messages to individual peers and peer groups is described. In an embodiment, all update messages that are to be advertised to a specific peer group are formatted and enqueued to that peer group before update messages are formatted for another peer group.

Figure 1:
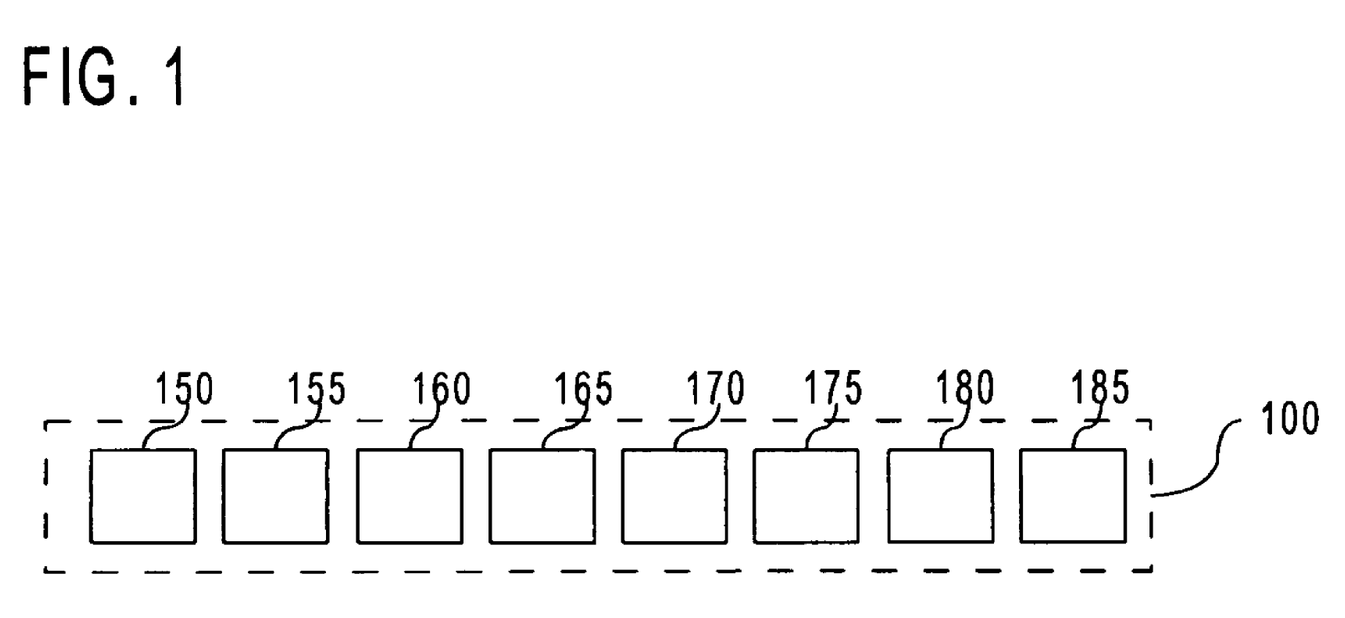
FIG. 1 is a block diagram that illustrates update messages generated during BGP.

FIG. 1 is a block diagram that illustrates a plurality of update messages 105, which include update messages 150, 155, 160 . . . 185. In BGP network convergence, update messages 105 are generated, formatted and "advertised" (i.e., transmitted) to peer groups. An update message contains information regarding a network route, such as path attributes and network layer reachability information. The information is used by members of peer groups to facilitate efficient routing of packets in the network.

A peer group is a group of one or more peers that share a common outbound policy. Thus, the same update messages can replicated and sent to each peer group member. In this application, the term "peer entity" refers to both peer groups and individual peers that are not members of peer groups. In embodiments which describe methods for advertising an update message to a peer entity or peer group, it is understood that such an embodiment may also teach advertising an update to an individual peer that is not a member of a peer group. BGP walks the BGP table only on the peer group or a peer that is considered the "peer group leader." Not all update messages 105 must be sent to each peer entity. BGP includes mechanisms, such as route map filtering or other filtering mechanisms, to determine which peer group(s) a particular update should be sent. BGP filters prefixes through the outbound policies and generates update messages, which it sends to the peer group or the peer group leader. In turn, the update messages are replicated and sent to the other peer group members.

Figure 2:
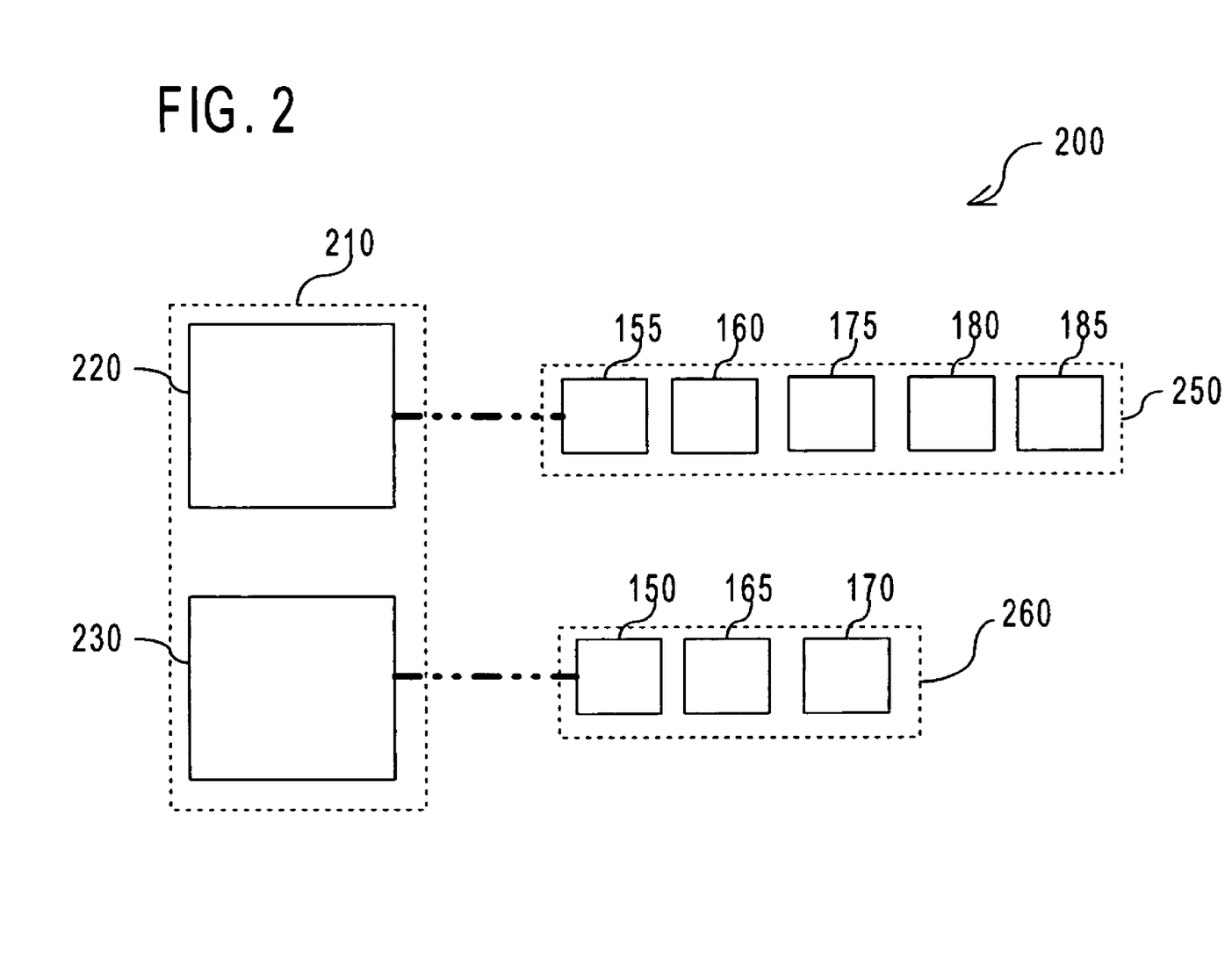
FIG. 2 is a block diagram that illustrates a first plurality of update messages associated with a first peer or peer group, and a second plurality of update messages associated with a second peer or peer group.

FIG. 2 is a block diagram of system 200 which includes first plurality of update messages 250 associated with first peer entity 220, and second plurality of formatted update messages 260 associated with second peer group entity. As described above, a filtering mechanism determines the particular peer entity 210 to which each particular update message 105 is to be sent. In the example depicted in FIG. 2, update messages 155, 160, 175, 180 and 185 are associated with peer entity 220, and update messages 150, 165 and 170 are associated with second peer entity 230.

Prior to being sent to their respective peer entities 210, update messages 105 must be formatted. In formatting, the format of an update message 105 is changed to a format that is suitable for the update message 105 to be received and processed by the peer entity 210 to which it is to be sent.

Figure 3:
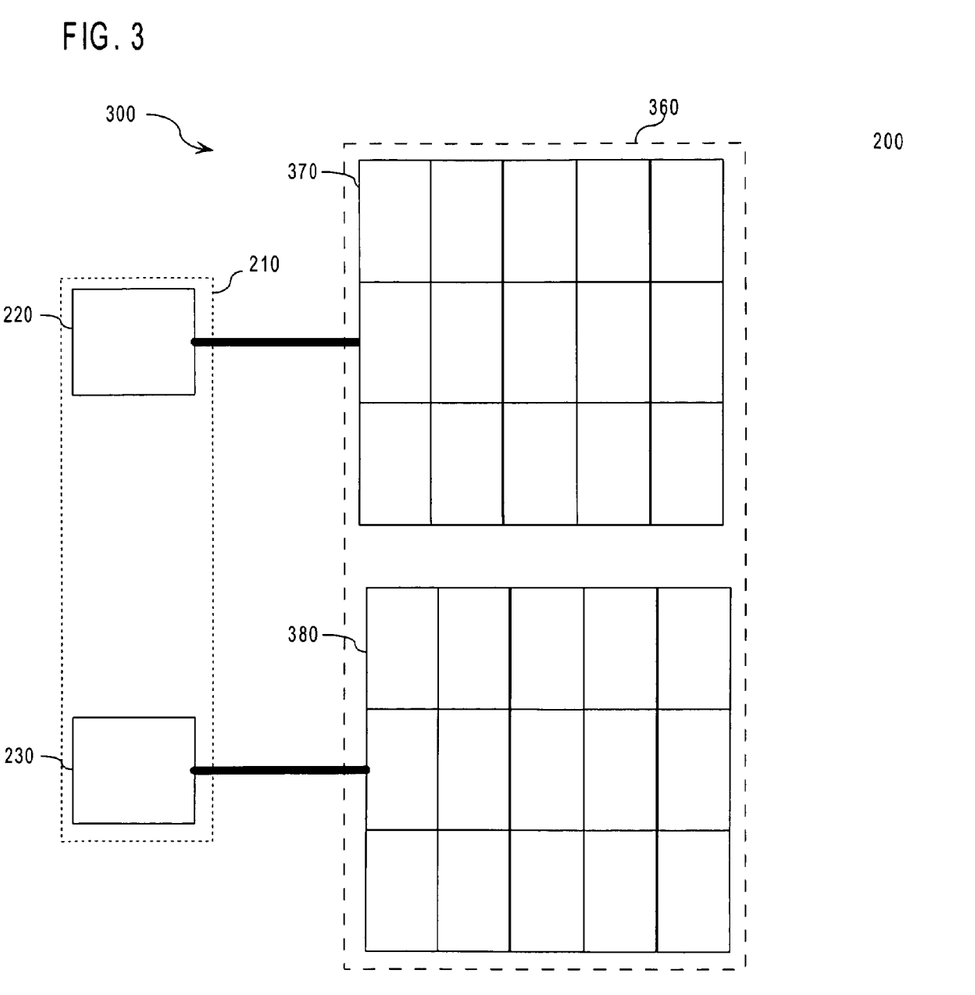
FIG. 3 is a block diagram that illustrates caches associated with peers or peer groups.

FIG. 3 is a block diagram depicting system 300. System 300 comprises a plurality of caches 360 associated with peer entities 210. Each cache 360 is associated with a separate peer entity 210. For example, cache 370 is associated with peer entity 220, and cache 380 is associated with peer entity 230. A cache 360 may be communicatively coupled to a peer entity 210, or may be communicatively coupled to one or more members of peer entity 210.

After an update message 105 is formatted, the formatted update message 205 is stored in the cache 360 that is associated with the peer entity 210 to which the formatted update message 205 is to be sent.

Figure 4:
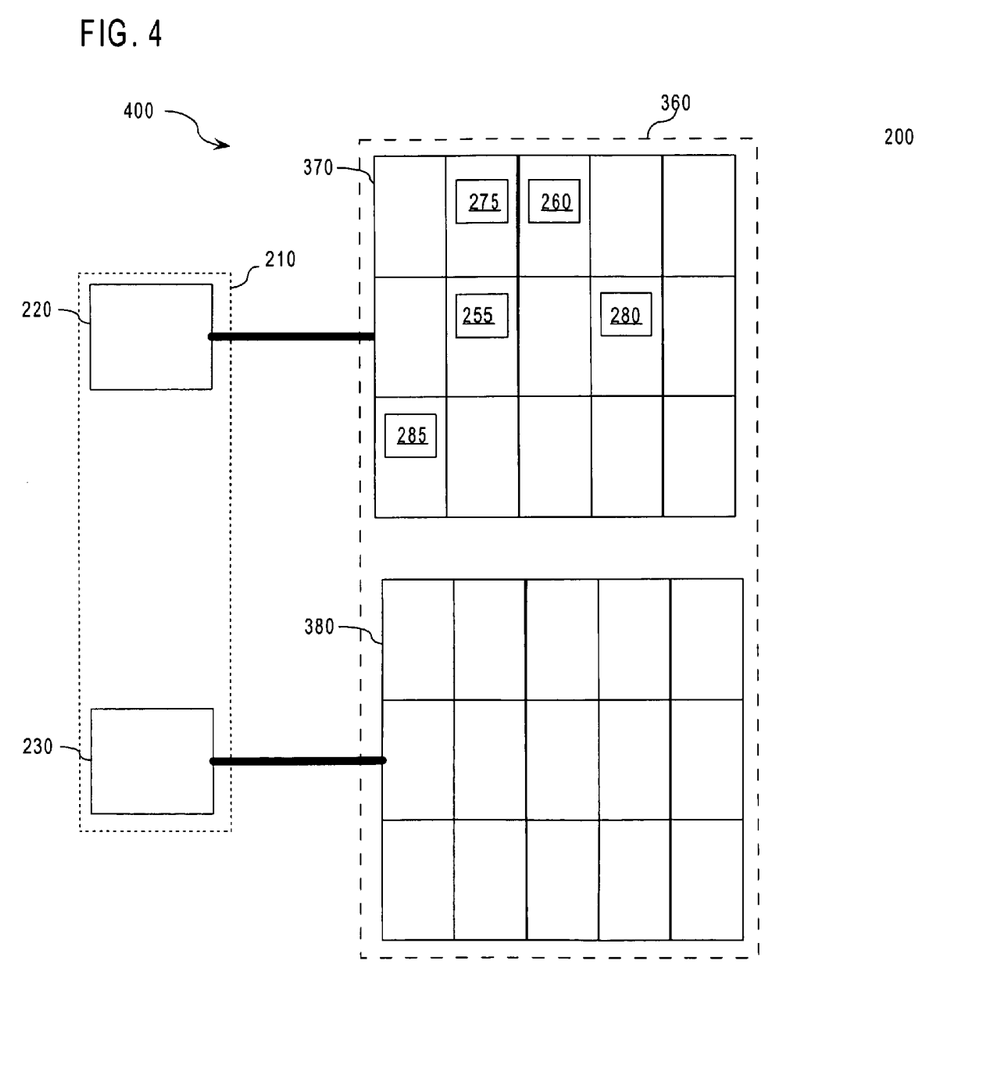
FIG. 4 is a block diagram that illustrates formatted update messages stored in a cache associated with a peer or peer group.

FIG. 4 is a block diagram that illustrates formatted update messages 205 stored in first cache 370, which is associated with first peer entity 220. As shown in FIG. 4, each message that is intended for first peer entity 220 will be formatted and stored in first cache 370. In an embodiment, before any messages intended for second peer entity 220 are formatted, all update messages 105 that are intended for peer entity 220 will be formatted and stored in cache 370. In an embodiment, if a limit on a quantity of update messages to be formatted is reached, a number of formatted update messages 205 will be enqueued to a queue associated with peer entity 220, thus freeing up space in cache 370 to store more formatted update messages 205. Or, in an embodiment, the formatting of update messages 105 intended for the first peer entity 220 will be suspended, and BGP will format update messages 105 intended for another peer entity 210. The formatting of update messages for first peer entity 220 may later be resumed.

The limit may also be set as a memory limit, or as a combination of message quantity and memory, or may be based on other characteristics of system 200. A memory limit may correspond to the amount of memory used to perform formatting. The limit may also be based on a quantity of messages or a memory limit reached during formatting and additional operations, such as enqueueing. In an embodiment, the limit is programmable. In an embodiment, the limit may be determined dynamically as suitable for the structure and operation of system 200.

Figure 5:
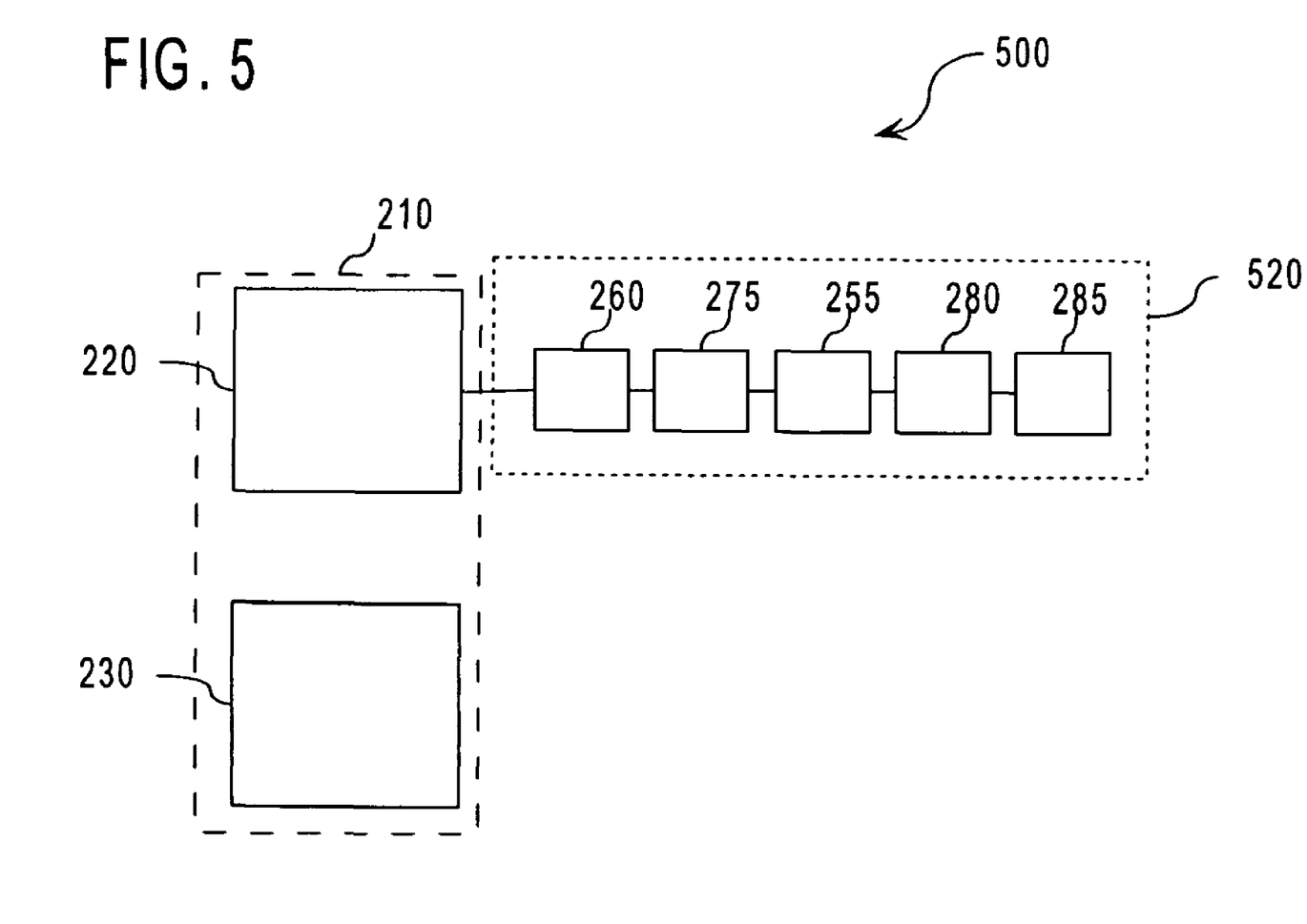
FIG. 5 is block diagram that illustrates formatted update messages enqueued to a queue associated with a first peer or peer group.

FIG. 5 is a block diagram depicting system 500. As shown in FIG. 5, the formatted update messages 205 stored in first cache 370 are enqueued to a queue 520, which is associated with first peer entity 220. In an embodiment, messages intended for second peer entity 230 will only be formatted and stored in cache 380, and subsequently enqueued to a queue associated with second peer entity 230, after all of the formatted update messages 205 stored in cache 370 have been enqueued to queue 520.

Formatted update messages 205 may be enqueued to queue 520 in an order corresponding to the order in which they were stored in cached in cache 370, such as in a first-in-first-out (FIFO) or last-in-first-out (LIFO) manner. In an embodiment, formatted update messages 205 are enqueued to queue 520 in no particular order.

In an embodiment, if a limit on a quantity of formatted update messages 205 to be enqueued is reached, formatted update messages 205 may be dequeued from queue 520 and advertised to peer entity 220, to free up queue 520. Or, in an embodiment, if a limit on a quantity of formatted update messages 205 to be enqueued is reached, the enqueuing of formatted update messages 205 intended for first peer entity 220 is suspended, and BGP will enqueue formatted update messages 205 intended for another peer entity 210. The enqueueing of formatted update messages 205 for first peer entity 220 may later resume.

The limit may also be set as a memory limit, or as a combination of message quantity and memory, or may be based on other characteristics of system 200. A memory limit may correspond to the amount of memory used to perform enqueuing. The limit may also be based on a quantity of messages or a memory limit reached during enqueueing and additional operations, such as formatting. In an embodiment, the limit is programmable. In an embodiment, the limit may also be dynamically altered as is suitable to customize the operation of system 200.

Figure 6:
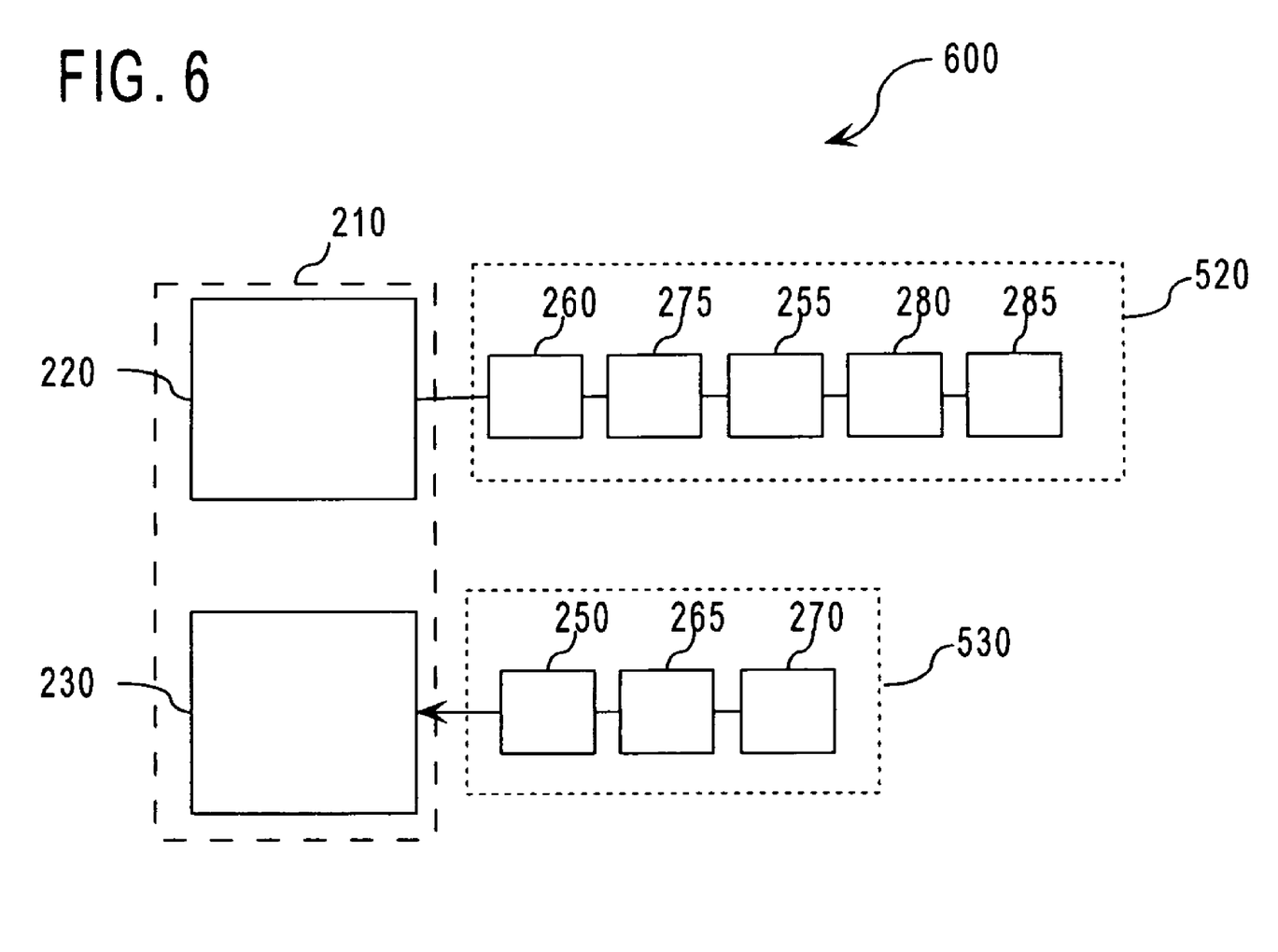
FIG. 6 is a block diagram that illustrates a first set of formatted update messages enqueued to a queue associated with a first peer or peer group, and a second set of formatted update messages enqueued to a queue associated with a second peer or peer group.

FIG. 6 is a block diagram that illustrates system 600 after formatted update messages 205 have been enqueued to queues associated with two peer entities 210. In the example shown, first plurality of formatted update messages 250 is enqueued to queue 520, which is associated with first peer entity 220, and second plurality of formatted update messages 260 is enqueued to queue 530, which is associated with second peer entity 230.

3.0 Methods of Advertising Updates to Peer Entities

Figure 7:
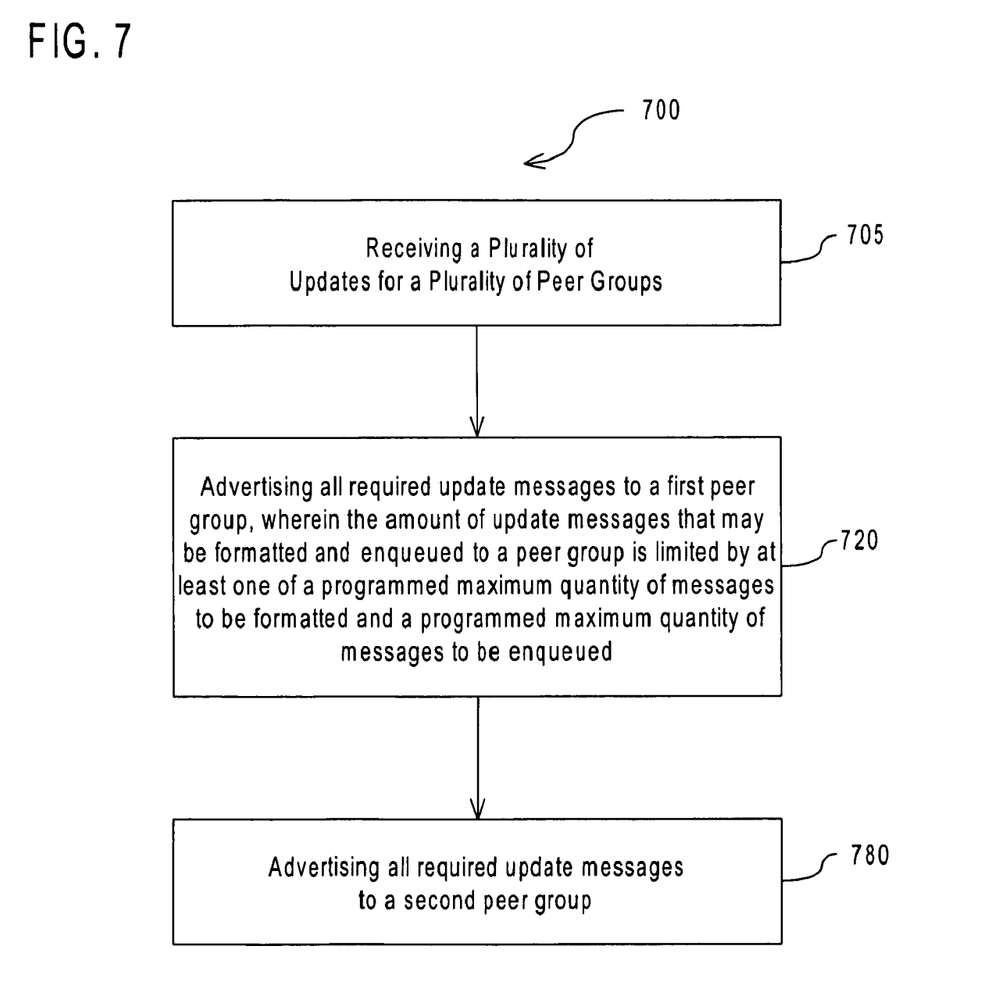
FIG. 7 is flow chart that illustrates a method of advertising update messages to peer groups.

FIG. 7 is a flow chart that illustrates method 700 of advertising update messages to a plurality of peer entities. In step 705, a plurality of update messages intended to be advertised to one or more peer entities is received. Step 710 includes advertising all required update messages to a first peer entity. All update messages that are intended for a first peer entity are advertised to the first peer entity before any update messages are advertised to a second peer entity.

The advertising of update messages will include steps of formatting update messages, enqueueing formatted update messages, and dequeuing and transmitting formatted update messages to the respective peer entity. The amount of messages that are formatted or enqueued may be limited by pre-programmed limits or dynamically determined limits. The limits may be set based on the amount of messages that are formatted and/or enqueued or based on the amount of memory used by formatting and/or enqueueing operations. The limits set on formatting and enqueueing do not need to be the same, as, in some instances, it may be more efficient to have different limits in respect of formatting and enqueueing. A combined limit based on the total number of messages formatted and messages enqueued may also be used. Step 720 provides an example in which a limit is programmed to limit the amount of update messages that may be formatted and enqueued to a peer entity by at least one of a programmed maximum quantity of messages to be formatted and a programmed maximum quantity of messages to be enqueued.

In step 780, update messages intended for a second peer entity are advertised to the second peer entity. In an embodiment, the update messages intended for the second peer entity are only advertised to the second peer entity after all of the update messages intended for the first peer entity have been advertised to the first peer entity or if the formatted update messages for the first peer entity are below the programmed maximum quantity of formatted messages and the enqueued messages for the first peer entity are below programmed maximum quantity of enqueued messages.

Figure 8:
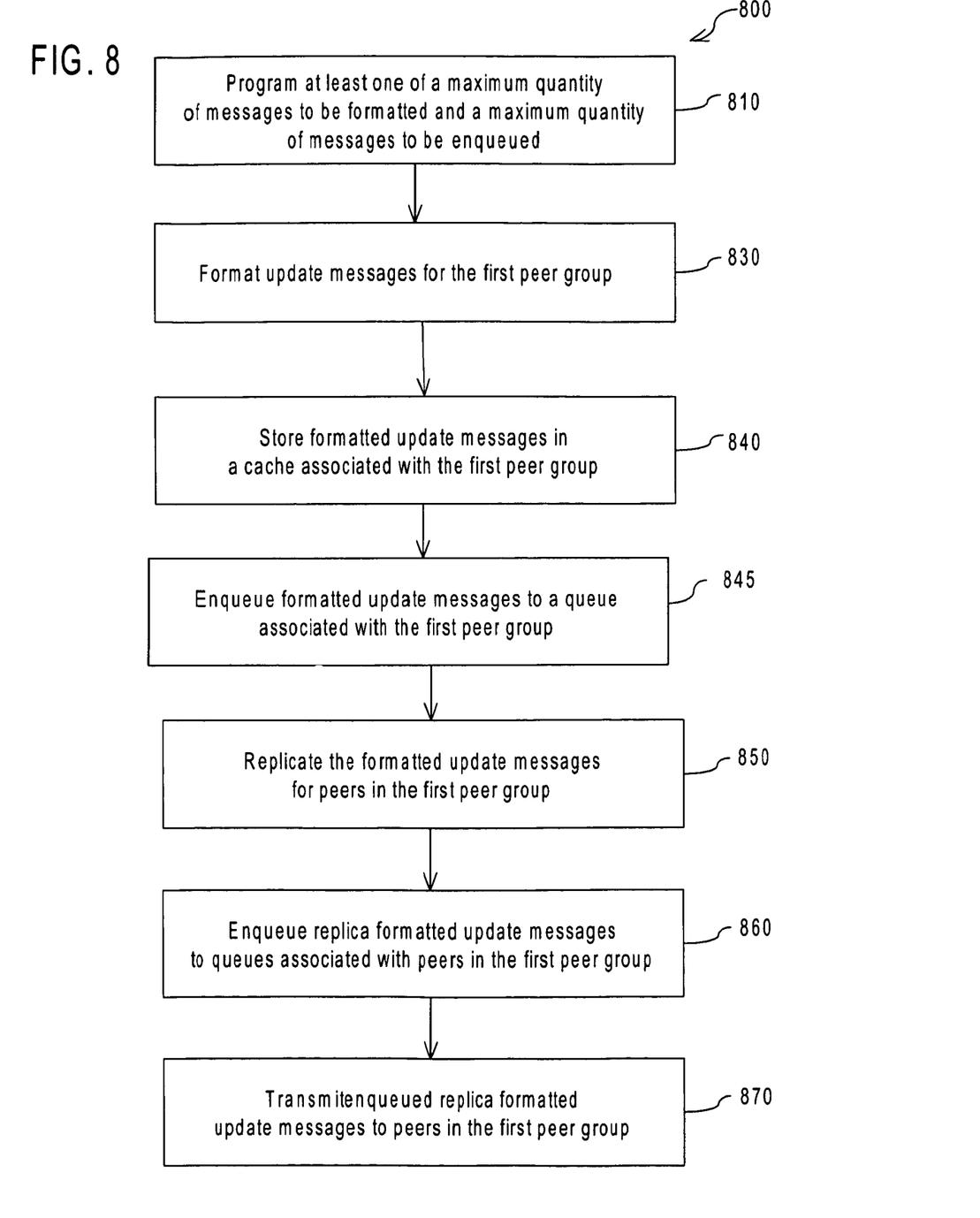
FIG. 8 is a flow chart that illustrates a method for formatting update messages, enqueueing formatted update messages, replicating formatted update messages, and advertising formatted update messages.

FIG. 8 is a flow chart that illustrates a detailed method 800 for advertising update messages to peer entities. Step 810 comprises programming at least one of a maximum quantity of messages to be formatted and a maximum quantity of messages to be enqueued. These quantities can be programmed in various combinations, as described above.

In step 830, update messages are formatted for a first peer entity. In step 840, formatted update messages are stored in a cache associated with the first peer entity.

In step 845, the formatted update messages are enqueued to a queue associated with a first peer entity. Steps 830, 840 and 845 have been described in detail above. The separation of formatting and enqueueing operations allows for all of the formatting of update messages for a peer entity to be completed before the steps of replication and enqueueing. This arrangement allows for an efficient use of transient memory and 100% packing.

In step 850, the formatted update messages are replicated for peers that are members of the first peer group (if the peer entity is a peer group). In step 860, replicated update messages are enqueued to queues associated with peers that are members of the first peer group. As a result, 100% replication is achievable.

In this case, step 845 of enqueueing formatted update messages to the peer group may comprise using a queue communicatively coupled to a peer-group leader that is a member of the peer group, or, may comprise using a queue communicatively coupled to a different item that is associated with the peer group as a whole.

In another embodiment, after the step 840, but without performing step 845, messages are replicated and then enqueued to separate queues associated with each of the peers that are members of the peer group.

In step 870, the enqueued replicated update messages are transmitted to peers in the first peer group. Additionally, in an embodiment, formatted update messages that are enqueued to the queue associated with the peer group, are transmitted to a peer group leader in the peer group.

After the foregoing steps have been completed, the steps may be repeated in respect of a second peer group. By advertising all update messages to the first peer group before advertising any update messages to the second peer group, fairness is eliminated and transient memory is utilized more efficiently.

Additionally, in an embodiment, an additional step of BGP table checkpointing is included in method 800, or, is used in methods that do not employ the steps of method 800. In checkpointing a point of reference in the BGP table is maintained. All peer entities may be updated up to the checkpointed version of the BGP table. The BGP table is later recheckpointed to another point of reference in the BGP table, which is subsequently maintained. Peer entities may then be updated up to the recheckpointed version of the BGP table.

4.0 Memory Limiting Scheme

Formatting and enqueueing update messages requires the use of memory. However, router systems have a limited amount of memory. Therefore, it is conceivable that if a great deal of messages must be formatted and/or enqueued, all of the available memory may be used, and there may not be sufficient memory to complete formatting and/or enqueueing.

Therefore, the use of a programmable limit on the amount of messages to be formatted, and/or a programmable limit on the amount of messages to be enqueued may be employed. If both a formatting quantity limit and an enqueueing quantity limit are used, the formatting quantity limit and the enqueueing quantity limit may be equivalent or non-equivalent. Non-equivalent quantities may be pre-specified, dynamically determined and/or adjusted to arrive at quantities that result in efficient formatting and enqueueing. In an embodiment, a single combined quantity limit on the quantity of messages formatted and enqueued may be programmed. In other embodiments, memory limits or limits on the quantity of messages formatted and/or enqueued may be dynamically determined.

In other embodiments, memory limits may be used. For example, a limit on the amount of memory that may be used for formatting may be set. Additionally, a limit on the amount of memory that may be used for enqueueing may be set. In embodiments, a combined limit on memory used for both formatting and enqueuing may be used.

If a formatting limit is reached in respect of formatting, formatting will temporarily cease, and then messages will be sent from a queue to the peer group associated with the queue(s). Formatted update messages in the cache associated with the peer group may then be queued. These actions will free up memory for further formatting. This scheme can also be performed if a combined limit on formatting and enqueueing is employed.

If an enqueueing limit is reached, then enqueued messages will be sent out to the peer group associated with the queue(s). This action will free up memory for further enqueueing. This scheme can also be performed if a combined limit on formatting and enqueueing is employed.

5.0 Implementation Mechanisms—Hardware Overview

Figure 9:
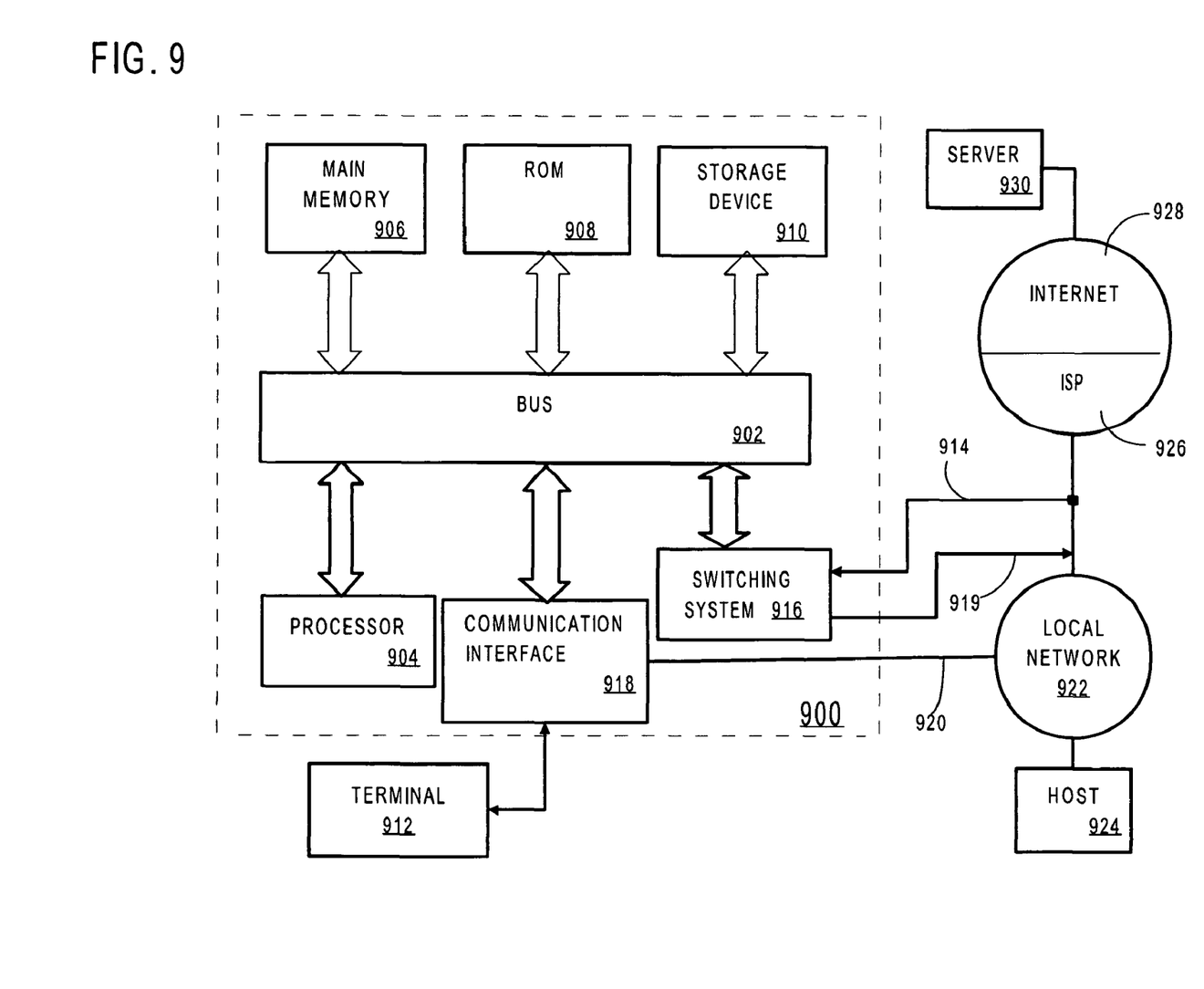
FIG. 9 is a block diagram that illustrates a system upon which an embodiment of the invention may be implemented.

FIG. 9 is a block diagram that illustrates a computer system 900 upon which an embodiment of the invention may be implemented. The preferred embodiment is implemented using one or more computer programs running on a network element such as a router device. Thus, in this embodiment, the computer system 900 is a router.

Computer system 900 includes a bus 902 or other communication mechanism for communicating information, and a processor 904 coupled with bus 902 for processing information. Computer system 900 also includes a main memory 906, such as a random access memory (RAM), flash memory, or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk, flash memory or optical disk, is provided and coupled to bus 902 for storing information and instructions.

A communication interface 918 may be coupled to bus 902 for communicating information and command selections to processor 904. Interface 918 is a conventional serial interface such as an RS-232 or RS-422 interface. An external terminal 912 or other computer system connects to the computer system 900 and provides commands to it using the interface 914. Firmware or software running in the computer system 900 provides a terminal interface or character-based command interface so that external commands can be given to the computer system.

A switching system 916 is coupled to bus 902 and has an input interface 914 and an output interface 919 to one or more external network elements. The external network elements may include a local network 922 coupled to one or more hosts 924, or a global network such as Internet 928 having one or more servers 930. The switching system 916 switches information traffic arriving on input interface 914 to output interface 919 according to pre-determined protocols and conventions that are well known. For example, switching system 916, in cooperation with processor 904, can determine a destination of a packet of data arriving on input interface 914 and send it to the correct destination using output interface 919. The destinations may include host 924, server 930, other end stations, or other routing and switching devices in local network 922 or Internet 928.

The invention is related to the use of computer system 900 for advertising update messages. According to one embodiment of the invention, update messages are advertised by computer system 900 in response to processor 904 executing one or more sequences of one or more instructions contained in main memory 906. Such instructions may be read into main memory 906 from another computer-readable medium, such as storage device 910. Execution of the sequences of instructions contained in main memory 906 causes processor 904 to perform the process steps described herein. One or more processors in a multi-processing arrangement may also be employed to execute the sequences of instructions contained in main memory 906. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 904 for execution. Such a medium may take many forms, including but not limited to, non-volatile media, volatile media, and transmission media. Non-volatile media includes, for example, optical or magnetic disks, such as storage device 910. Volatile media includes dynamic memory, such as main memory 906. Transmission media includes coaxial cables, copper wire and fiber optics, including the wires that comprise bus 902. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infrared transmitter to convert the data to an infrared signal. An infrared detector coupled to bus 902 can receive the data carried in the infrared signal and place the data on bus 902. Bus 902 carries the data to main memory 906, from which processor 904 retrieves and executes the instructions. The instructions received by main memory 906 may optionally be stored on storage device 910 either before or after execution by processor 904.

Communication interface 918 also provides a two-way data communication coupling to a network link 920 that is connected to a local network 922. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the worldwide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are exemplary forms of carrier waves transporting the information.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918. In accordance with the invention, one such downloaded application provides for advertising update messages as described herein.

The received code may be executed by processor 904 as it is received, and/or stored in storage device 910, or other non-volatile storage for later execution. In this manner, computer system 900 may obtain application code in the form of a carrier wave.

6.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer-implemented method for updating border gateway protocol (BGP) peer entities in a communication network comprising:
   among a set of update messages, formatting a plurality of the update messages to be advertised to a first BGP peer entity to establish a first quantity of formatted update messages, wherein the first BGP peer entity is a BGP router, wherein the first quantity of the formatted update messages is less than or equal to the set of update messages;
   among the first quantity of formatted update messages, enqueueing to a queue, a plurality of formatted update messages, wherein a quantity of the enqueued formatted update messages is less or equal to the first quantity of formatted update messages;
   wherein at least one of the first quantity of formatted update messages and the quantity of the enqueued formatted update messages is a programmable quantity;
   after all in the plurality of update messages for the first BGP peer entity are formatted for the first BGP peer entity, formatting a second quantity of update messages to be advertised to a second BGP peer entity;
   wherein the second quantity of update messages is a subset of the set of update messages;
   wherein steps in the method are performed by one or more computing devices.

2. The method recited in claim 1, further comprising replicating one of the first quantity of formatted update messages to establish a replica formatted update message; enqueueing the replica formatted update message to a queue associated with a peer in the peer group; transmitting the replica formatted update message from the queue associated with the peer group to a peer in the peer group.

3. The method recited in claim 1, wherein the first quantity of formatted update messages to be enqueued is programmable; further comprising programmatically receiving the first quantity of formatted update messages to be enqueued; after all of the first quantity of formatted update messages are enqueued, formatting the second quantity of update messages for the second BGP peer entity.

4. The method recited in claim 1, wherein the plurality of update messages to be formatted is unequal to the first quantity of formatted update messages to be enqueued.

5. The method recited in claim 1, wherein the plurality of update messages to be formatted is programmable; further comprising programmatically receiving the plurality of update messages to be formatted; after the plurality of update messages are formatted in the step of formatting, transmitting enqueued messages from the queue.

6. The method recited in claim 1, wherein the first quantity of formatted update messages to be enqueued is programmable, the method further comprising programming the first quantity of formatted update messages to be enqueued and after the first quantity of formatted update messages of the programmed quantity are enqueued, transmitting enqueued messages from the queue.

7. A non-transitory computer-readable volatile or non-volatile storage medium storing one or more sequences of instructions which, when executed by one or more processors, cause the one or more processors to carry out:
   among a set of update messages, formatting a plurality of the update messages to establish a first quantity of formatted update messages to be advertised to a first BGP peer entity, wherein the first BGP peer entity is a router, wherein the first quantity of the formatted update messages is less than or equal to the set of update messages; and
   among the first quantity of formatted update messages, enqueueing to a queue, a plurality formatted update messages, wherein a quantity of the enqueued formatted update messages is less or equal to the first quantity of formatted update messages;
   wherein at least one of the first quantity of formatted update messages and the quantity of the enqueued formatted update messages is a programmable quantity;
   after all in the plurality of update messages for the first BGP peer entity are formatted for the first BGP peer entity, formatting a second quantity of update messages to be advertised to a second BGP peer entity;
   wherein the second quantity of update messages is a subset of the set of update messages.

8. The non-transitory computer-readable medium of claim 7, further comprising sequences of instructions which, when executed by the one or more processors, cause the one or more processors to carry out replicating one of the first quantity of formatted update messages to establish a replica formatted update message; enqueueing the replica formatted update message to a queue associated with a peer in the peer group; transmitting the replica formatted update message from the queue associated with the peer group to a peer in the peer group.

9. The non-transitory computer-readable medium of claim 7 wherein the first quantity of formatted update messages to be enqueued is programmable and further comprising one or more sequences of instructions which, when executed by the one or more processors, cause the one or more processors to carry out programmatically receiving the first quantity of formatted update messages to be enqueued; after all of the first quantity of formatted update messages are enqueued in the step of enqueueing messages for the first BGP peer entity, formatting the second quantity of update messages for the second BGP peer entity.

10. The non-transitory computer-readable medium of claim 7 wherein the plurality of update messages to be formatted is unequal to the first quantity of formatted update messages to be enqueued.

11. The non-transitory computer-readable medium of claim 7 wherein the plurality of update messages to be formatted is programmable and further comprising one or more sequences of instructions which, when executed by the one or more processors, cause the one or more processors to carry out programmatically receiving the plurality of update messages to be formatted; and after the plurality of update messages are formatted in the step of formatting, transmitting enqueued messages from the queue.

12. The non-transitory computer-readable medium of claim 7 wherein the first quantity of formatted update messages to be enqueued is programmable and further comprising one or more sequences of instructions which, when executed by the one or more processors, cause the one or more processors to carry out programming the first quantity of formatted update messages to be enqueued; and after the first quantity of formatted update messages of the programmed quantity are enqueued in the step of enqueueing, transmitting enqueued messages from the queue.

13. A router, comprising:
one or more processors;
one or more network interfaces coupled to the one or more processors;
a storage device coupled to the one or more processors and storing one or more sequences of instructions which, when executed by the one or more processors, cause the one or more processors to update peer entities in a communication network by performing:
among a set of update messages, formatting a plurality of the update messages to establish a first quantity of formatted update messages to be advertised to a first BGP peer entity, wherein the first BGP peer entity is a router, wherein the first quantity of the formatted update messages is less than or equal to the set of update messages;
among the first quantity of formatted update messages, enqueueing to a queue, a plurality formatted update messages, wherein a quantity of the enqueued formatted update messages is less or equal to the first quantity of formatted update messages;
wherein at least one of the first quantity of formatted update messages and the quantity of the enqueued formatted update messages is a programmable quantity;
after all in the plurality of update messages for the first BGP peer entity are formatted for the first BGP peer entity, formatting a second quantity of update messages to be advertised to a second BGP peer entity;
wherein the second quantity of update messages is a subset of the set of update messages.

14. The router recited in claim 13, further comprising instructions which, when executed, cause replicating one of the first quantity of formatted update messages to establish a replica formatted update message.

15. The router recited in claim 13, wherein the first quantity of formatted update messages to be enqueued is programmable, the router further comprising instructions which, when executed, cause programmatically receiving the first quantity of formatted update messages to be enqueued; after all of the first quantity of formatted update messages are enqueued, formatting the second quantity of update messages for the second BGP peer entity.

16. The router recited in claim 13, wherein the quantity of update messages to be formatted is unequal to the first quantity of formatted update messages to be enqueued.

17. The router recited in claim 13, wherein the plurality of update messages to be formatted is programmable, the router further comprising instructions which, when executed, cause programmatically receiving the plurality of update messages to be formatted; and after the plurality of update messages are formatted, transmitting enqueued messages from the queue.

18. The router recited in claim 13, wherein the first quantity of formatted update messages to be enqueued is programmable, the router further comprising instructions which, when executed, cause programming the first quantity of formatted update messages to be enqueued; after the first quantity of formatted update messages are enqueued, transmitting enqueued messages from the queue.

19. A computer-implemented method, comprising:
a router configured with border gateway protocol (BGP) receiving a plurality of BGP update messages for a plurality of BGP peer groups;
receiving programming of a maximum quantity of messages to be formatted and a maximum quantity of messages to be enqueued;
formatting, up to the maximum quantity of messages to be formatted, a first quantity of formatted BGP update messages, from the plurality of BGP update messages, to be advertised to a first BGP router in a first peer group;
storing the first quantity of formatted BGP update messages for the first router in a cache associated with the first peer group;
enqueuing, up to the maximum quantity of messages to be enqueued, the first quantity of formatted BGP update messages to a queue associated with the first peer group;
replicating the first quantity of formatted BGP update messages for each peer in the first peer group;
enqueuing replica formatted update messages to queues associated with the peers in the first peer group;
transmitting the enqueued replica formatted update messages to each peer in the first peer group;
after all of the maximum quantity of messages for the first BGP router are formatted for the first peer group, formatting up to the maximum quantity of messages, a second quantity of BGP update messages to be advertised to each peer in a second peer group;
wherein the second quantity of BGP update messages is a subset of the plurality of BGP update messages;
wherein steps in the method are performed by one or more computing devices.

20. The method of claim 19, further comprising in response to reaching the maximum quantity of messages to be formatted, suspending the formatting of the first quantity of BGP update messages for the first peer entity and formatting update messages intended for another peer entity.

* * * * *